(12) United States Patent
Makino et al.

(10) Patent No.: US 6,315,527 B1
(45) Date of Patent: Nov. 13, 2001

(54) MOTOR-DRIVEN COMPRESSOR

(75) Inventors: Masahiko Makino, Yasu-gun; Minoru Fukumoto, Nara; Nobuyuki Nishii, Otsu; Hitoshi Funami, Ikoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/547,044

(22) Filed: Apr. 11, 2000

(30) Foreign Application Priority Data

Apr. 12, 1999 (JP) .................................................. 11-103823
Apr. 13, 1999 (JP) .................................................. 11-105193

(51) Int. Cl.[7] ...................................................... F04B 35/04
(52) U.S. Cl. ..................... 417/410.1; 310/198; 339/64 M
(58) Field of Search ..................................... 439/685, 801, 439/883; 417/410.1

(56) References Cited

U.S. PATENT DOCUMENTS

| 3,601,780 | * | 8/1971 | De Lyon | 339/192 |
| 3,850,496 | * | 11/1974 | Hague | 339/64 M |
| 4,883,925 | * | 11/1989 | Graf | 174/84 R |
| 5,231,324 | * | 7/1993 | Kawamura et al. | 310/198 |

FOREIGN PATENT DOCUMENTS

| 2000297758-A | * | 10/2000 | (JP) | F04B/39/00 |
| 2000297759-A | * | 10/2000 | (JP) | F04B/39/00 |

* cited by examiner

Primary Examiner—Charles G. Freay
Assistant Examiner—Han L. Liu
(74) Attorney, Agent, or Firm—Wenderoth, Lind & Ponack, L.L.P.

(57) ABSTRACT

A motor-driven compressor is driven by a driving device via a single-circuit external wiring system. The motor-driven compressor includes a closed vessel, a compression mechanism accommodated in the closed vessel, and an electric motor accommodated in the closed vessel for driving the compression mechanism. The electric motor includes three-phase stator windings each having two parallel circuits.

13 Claims, 12 Drawing Sheets

MOTOR-DRIVEN COMPRESSOR

BACKGROUND OF THE INVENTION

1. Field of the Invention

The present invention relates to a motor-driven compressor which is driven by a driving device connected to a low-voltage power source and through which a relatively large electric current flows.

2. Description of the Related Art

Conventional electric cars or hybrid cars are generally provided with a plurality of 12-volt batteries, and a motor-driven compressor for an air conditioner mounted therein is supplied with, for example, 200 to 300 volts of electricity.

FIG. 1 depicts a motor-driven compressor 2 for an air conditioner mounted in a conventional electric car. The compressor 2 has a shell that is made up of a generally cylindrical shell 4, a lower shell 6 joined to one end of the generally cylindrical shell 4, and an upper shell 8 joined to the other end of the generally cylindrical shell 4. The shell accommodates an electric motor 10 and a compression mechanism 12 driven by the electric motor 10. The electric motor 10 includes a stator 10a secured to the generally cylindrical shell 4 and a rotor 10b secured to a crank shaft 14 constituting the compression mechanism 12.

An electric power from a power source (not shown) is supplied to the motor-driven compressor 2 via a driving device (not shown), a wiring system (not shown), and the like. In applications where the voltage of the power source ranges from 200 to 300 volts, an electric current of only 6 to 7 amperes flows through electric wires, pins of a terminal 16 secured to the upper shell 8 of the motor-driven compressor 2, and lead wires 18 connected to the pins. Accordingly, the diameter of the electric wires is relatively small and, for example, 2-mm$^2$ electric wires are generally used.

In some motor-driven compressors, an electric current larger than that in the compressors referred to above flows. If an electric current of, for example, 15 to 20 amperes flows in the compressors, wiring must be conducted using about 3-mm$^2$ electric wires. In that case, a terminal larger than the terminal 16 shown in FIG. 1 is mounted to the upper shell 8.

Recently, a study of electric cars or hybrid cars for practical use is being made at a high pace, and from the viewpoint of safety, there is a tendency to use a 36-volt power source, for example, by connecting three 12-volt batteries in series.

However, if a motor-driven compressor is supplied with 36 bolts of electricity, a large electric current of about 60 to 80 amperes flows through the terminal and the lead wires of the motor-driven compressor via the wiring system. Accordingly, it is necessary for the electric wires to have an increased diameter to allow the electric current of 60 to 80 amperes to flow therethrough. The increase in diameter hardens the electric wires and reduces the degree of freedom of wiring, thus making the wiring very difficult.

Returning to FIG. 1, the lead wires 18 of stator windings have respective tab receptacles 19 connected thereto, while the terminal 16 secured to the upper shell 8 has pins and tabs welded to respective pins. In assembling the motor-driven compressor 2, the tab receptacles 19 of the lead wires 18 are connected to the tabs of the terminal 16. However, because the internal space of the upper shell 8 is extremely limited, if the diameter of the lead wires 18 is large, it is very difficult to connect the tab receptacles 19 to the tabs of the terminal 16. Furthermore, if the diameter of the lead wires 18 is large, the heat radiating properties at the connecting portions decrease.

In addition, where a motor-driven compressor is installed in an automotive vehicle, it is necessary to take the resistance to vibration, the resistance to impact, and the like into due consideration. In particular, a hermetic terminal for connection with an external power source requires good hermetic properties or resistance to thermal shock, and also requires a reduction in contact resistance in order to maintain the current-carrying ability in view of the use of a low-voltage and large-current power source.

Conventionally, as shown in FIGS. 2A and 2B, the terminal 16 secured to the upper shell 8 is connected to the external power source by press-fitting tab receptacles 22 connected to external electric wires to external tabs 20 secured to the terminal 16. However, a mere press-fitting increases the contact resistance, and if the diameter of the electric wires is large, there arises a problem in that the mutually connected elements are easily disconnected from each other by vibration.

Also, because the wiring of the large-diameter lead wires is difficult, there is a danger of the lead wires being brought into contact with the shell in the vicinity of the terminal, giving rise to a leakage of electricity.

SUMMARY OF THE INVENTION

The present invention has been developed to overcome the above-described disadvantages.

It is accordingly an objective of the present invention to provide a highly reliable motor-driven compressor driven with electricity of a low voltage and a large electric current.

Another objective of the present invention is to provide the motor-driven compressor of the above-described type that is capable of enhancing the workability during wiring.

In accomplishing the above and other objectives, the motor-driven compressor according to the present invention is driven by a driving device via a single-circuit external wiring system and includes a closed vessel, a compression mechanism accommodated in the closed vessel, and an electric motor accommodated in the closed vessel for driving the compression mechanism, wherein the electric motor including three-phase stator windings each having two parallel circuits.

This construction can cope with the supply of a large electric current without increasing the diameter of electric wires within a limited space inside the closed vessel. Accordingly, the workability is not lowered.

The motor-driven compressor further includes a terminal secured to the closed vessel and having a plurality of pins. Each of the plurality of pins has two tabs secured thereto for connection with the two parallel circuits of the stator winding of each phase. This arrangement ensures sufficient heat radiating properties without increasing the contact resistance.

Conveniently, all the tabs extend radially or parallel to one another in the same direction, thereby maintaining a predetermined distance between the two tabs for each phase and preventing interference between the neighboring phases. Furthermore, the workability during wiring is enhanced.

The motor-driven compressor also includes plural pairs of tab receptacles, each pair of which is connected to the two tabs of each of the plurality of pins, wherein each pair is constituted by two tab receptacles from which respective lead wires extend in opposite directions and which are paired such that the lead wires extend in the same direction. By this construction, each pair of tab receptacles can be readily fitted to the corresponding tabs, making it possible to enhance the workability during wiring.

Preferably, each of the plurality of pins has an externally threaded portion, to which a nut is tightened for connection with the external wiring system. This arrangement prevents the mutually connected elements from being disconnected, for example, by vibration and provides a highly reliable motor-driven compressor.

In another form of the present invention, a motor-driven compressor includes a closed vessel having a terminal secured thereto for connection with an external wiring system, a compression mechanism accommodated in the closed vessel, an electric motor accommodated in the closed vessel for driving the compression mechanism, a plurality of lead wires for connecting a plurality of stator windings of the electric motor to the terminal, each of the plurality of lead wires being divided into two lead wires, and a plurality of intermediate connecting portions each for connecting the two lead wires.

This construction ensures a sufficient working space and, hence, enhances the workability during wiring even if the diameter of electric wires is relatively large.

Each of the plurality of intermediate connecting portions includes an insulation cover slidably mounted on one of the two lead wires. With this arrangement, after the two lead wires have been connected to each other, a connecting portion therebetween is covered with the insulation cover by sliding the insulation cover along the one of the two lead wires. As a result, the connecting portion is insulated from peripheral elements, thus enhancing the reliability of the motor-driven compressor.

Advantageously, the insulation cover has a saw teeth-shaped stopper formed therewith on one side thereof. The saw-teeth-shaped stopper acts to prevent the insulation cover from being dislocated from the connecting portion, thereby preventing a leakage of electricity.

It is preferred that the two lead wires be welded together. Welding ensures the connection between the two lead wires and reduces the contact resistance.

Advantageously, the motor-driven compressor further includes a wire holder held in engagement with the terminal for holding the plurality of lead wires. The wire holder prevents the lead wires from being brought into contact with the closed vessel, enhancing the reliability of the compressor.

Conveniently, the terminal is secured to a generally cylindrical side wall of the closed vessel. This arrangement prevents the lead wires from being brought into contact with an end wall of the closed vessel and shortens the length of the lead wires, thereby improving the workability during wiring.

It is preferred that the plurality of lead wires be welded to the terminal.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on applications Nos. 11-103823 and 11-105193 filed Apr. 12 and 13, 1999, respectively, in Japan, the content of which is incorporated hereinto by reference.

Figure 1:
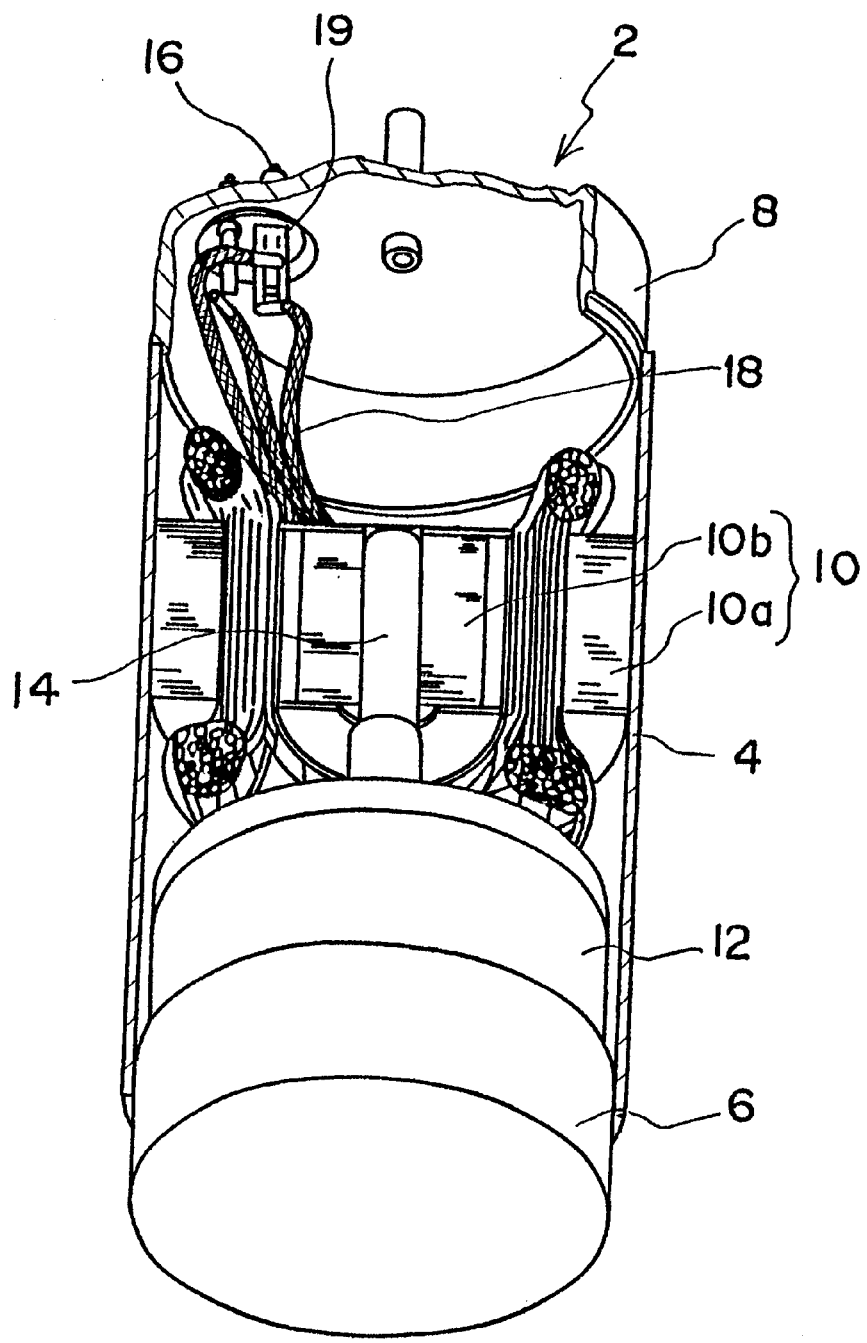
FIG. 1 is a perspective view, partly in section, of a conventional motor-driven compressor.
Figure 2A:
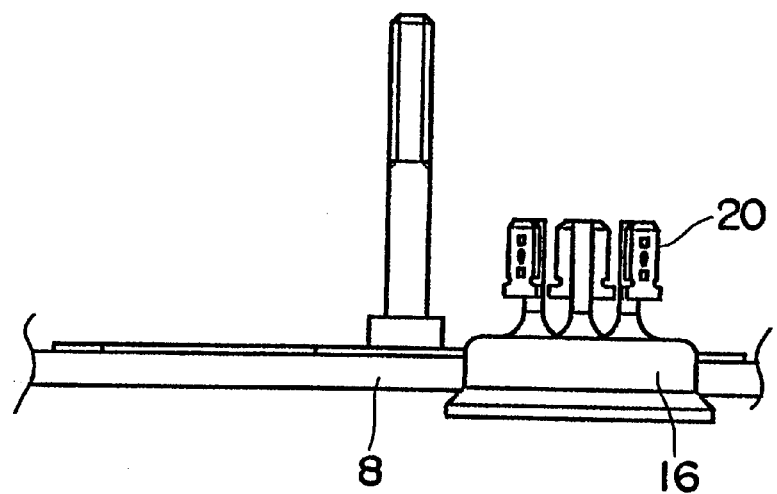
FIG. 2A is an elevational view of a terminal secured to the compressor of FIG. 1.
Figure 2B:
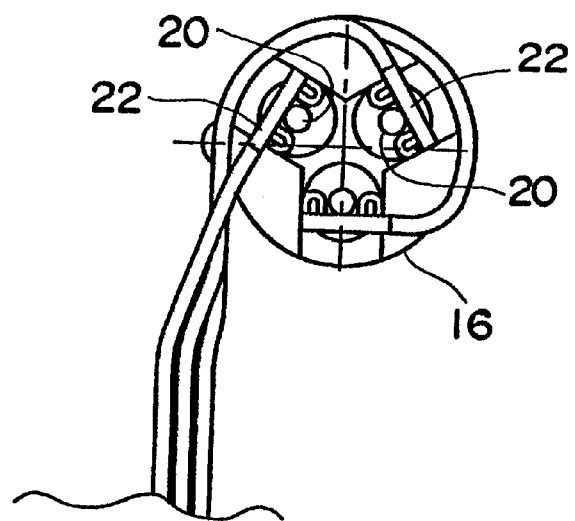
FIG. 2B is a top plan view of the terminal of FIG. 2A.
Figure 3:
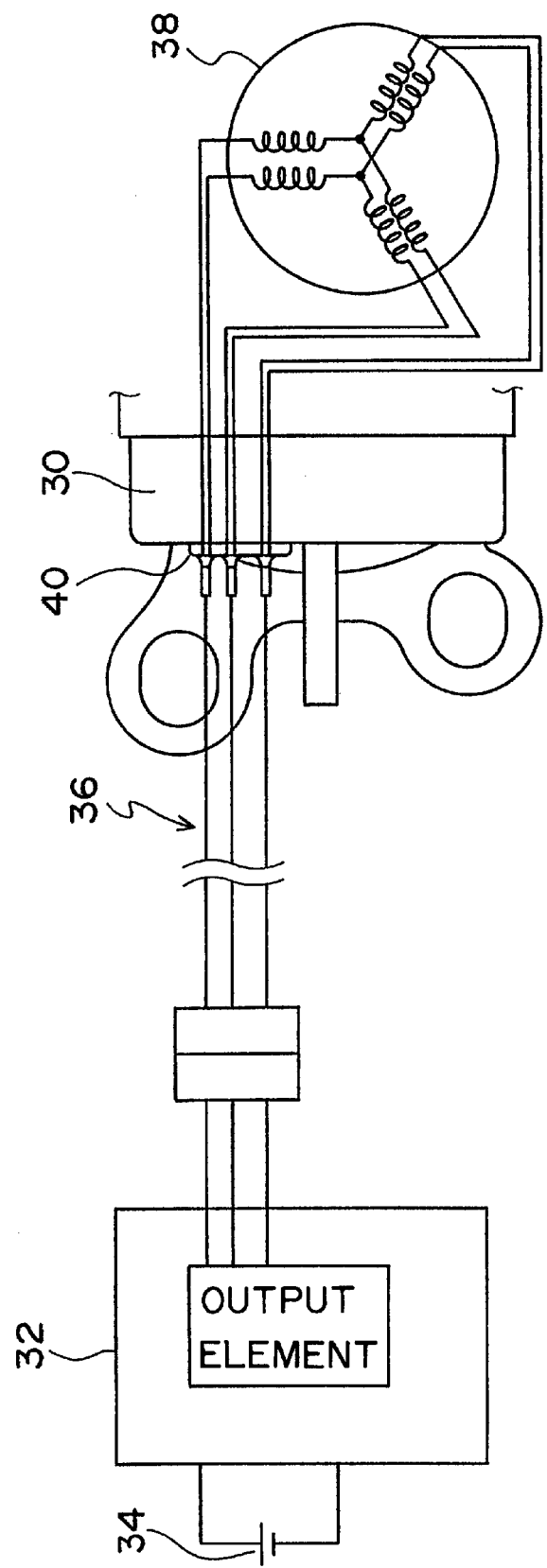
FIG. 3 is a schematic wiring diagram of an air conditioner to which a motor-driven compressor according to a first embodiment of the present invention is applied.

Referring now to the drawings, there is schematically shown in FIG. 3 an air conditioner for use in an electric car. The air conditioner shown therein includes a motor-driven compressor 30 according to a first embodiment of the present invention and a driving device 32 for driving the motor-driven compressor 30. The driving device 32 includes an inverter connected to a DC or AC power source (DC power source is depicted in FIG. 3) for controlling the electric power supplied to the motor-driven compressor 30 via a wiring system 36.

In this embodiment, from the viewpoint of safety with respect to the human body, the voltage of the power source is lower than 60 volts and is set to, for example, 36 volts. In the case where the motor-driven compressor 30 is driven at a low voltage, a relatively large electric current flows through the motor-driven compressor 30. Accordingly, an electric motor 38 mounted therein for driving a compression mechanism (not shown) has three-phase stator windings, each divided into two parallel circuits. Furthermore, two lead wires of the stator winding of each phase are connected to one of a plurality of tabs of a terminal 40 secured to a shell that constitutes a closed vessel, while the terminal 40 and the driving device 32 are electrically connected with each other via the single-circuit wiring system 36.

Figure 4A:
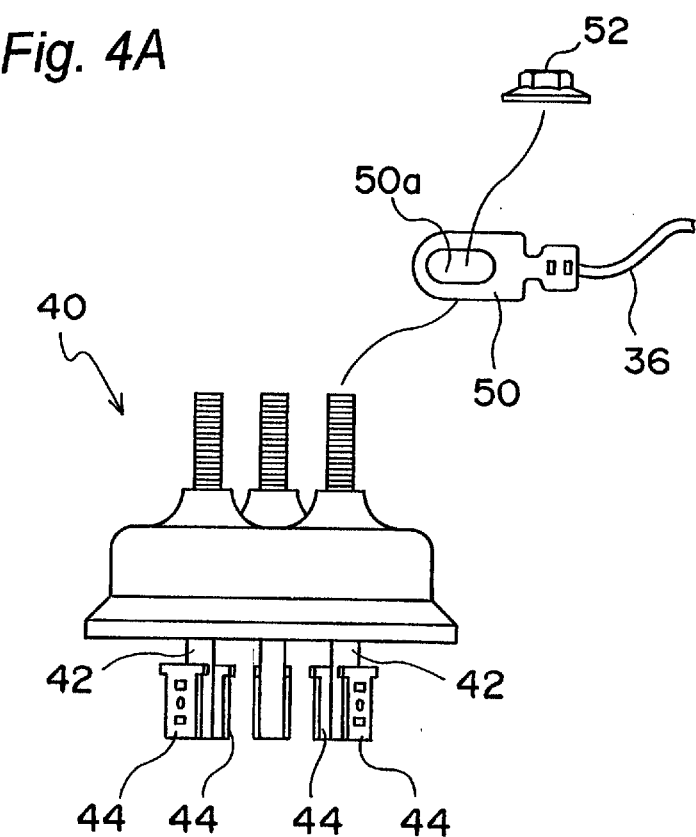
FIG. 4A is an elevational view of a terminal secured to the compressor shown in FIG. 3.
Figure 4B:
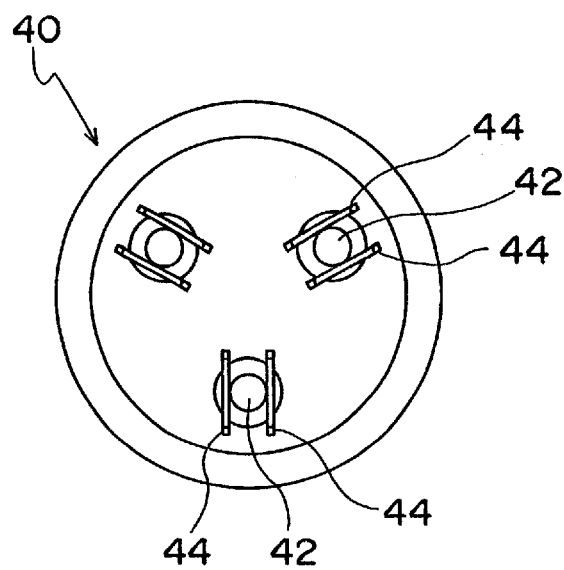
FIG. 4B is a top plan view of the terminal of FIG. 4A.

As shown in FIGS. 4A and 4B, the terminal 40 has three pins 42 secured thereto. Each pin 42 has two parallel tabs 44 welded thereto on the motor side thereof and is externally threaded on the external-wiring side thereof. All the tabs 44 are welded to the corresponding pins 42 so as to extend radially, thereby maintaining a predetermined distance between the two tabs 44 for each phase and preventing interference between the neighboring phases.

Figure 5:
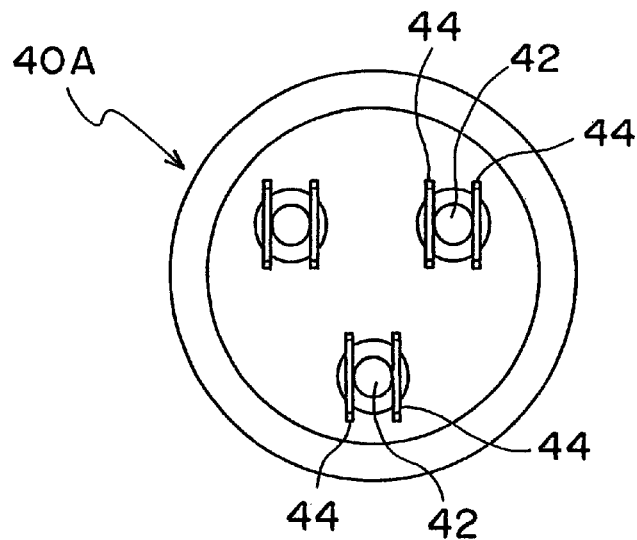
FIG. 5 is a view similar to FIG. 4B, but depicting a modification thereof.

Alternatively, as shown in FIG. 5, all the tabs 44 may be welded to the corresponding pins 42 so as to extend parallel to one another in the same direction, thereby improving the workability during wiring.

Figure 6:
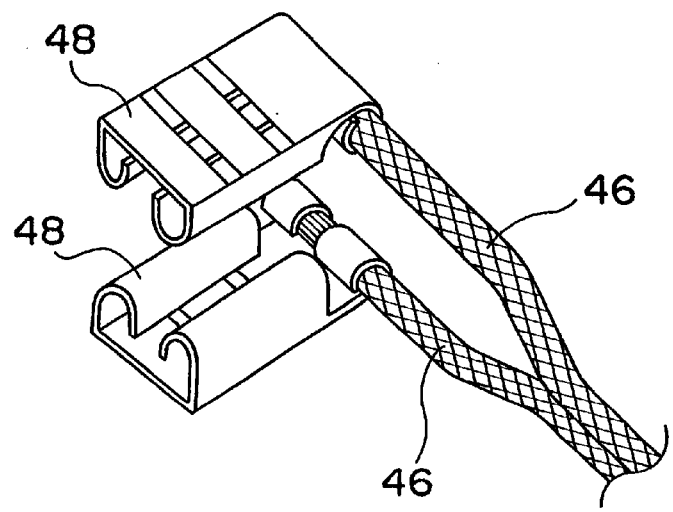
FIG. 6 is a perspective view of a pair of tab receptacles having respective lead wires, which are connected to one of a plurality of pins of the terminal.

FIG. 6 depicts the two lead wires 46 of the stator winding of each phase. The two lead wires 46 have respective side type tab receptacles 48 fixedly mounted thereon for connection with the tabs 44 secured to each pin.

As shown in FIG. 6, the two side type tab receptacles 48 are fixedly mounted on bare ends of the lead wires 46 in a reverse fashion so that the former may be easily fitted on the two tabs 44 disposed on respective sides of each pin 42. In other words, this pair is constituted by two side type tab receptacles 48 from which respective lead wires 46 extend in opposite directions and which are paired such that the lead wires 46 extend in the same direction. By so doing, the wiring work is considerably facilitated.

On the other hand, as shown in FIG. 4A, each electric wire in the wiring system 36 has an eyelet terminal 50 fixedly mounted on a bare end thereof. The eyelet terminal 50 is fitted on one of the pins 42 by loosely inserting the pin into an opening 50a of the eyelet 50 and subsequently by tightening a nut 52 to the threaded portion of the pin 42.

Figure 7:
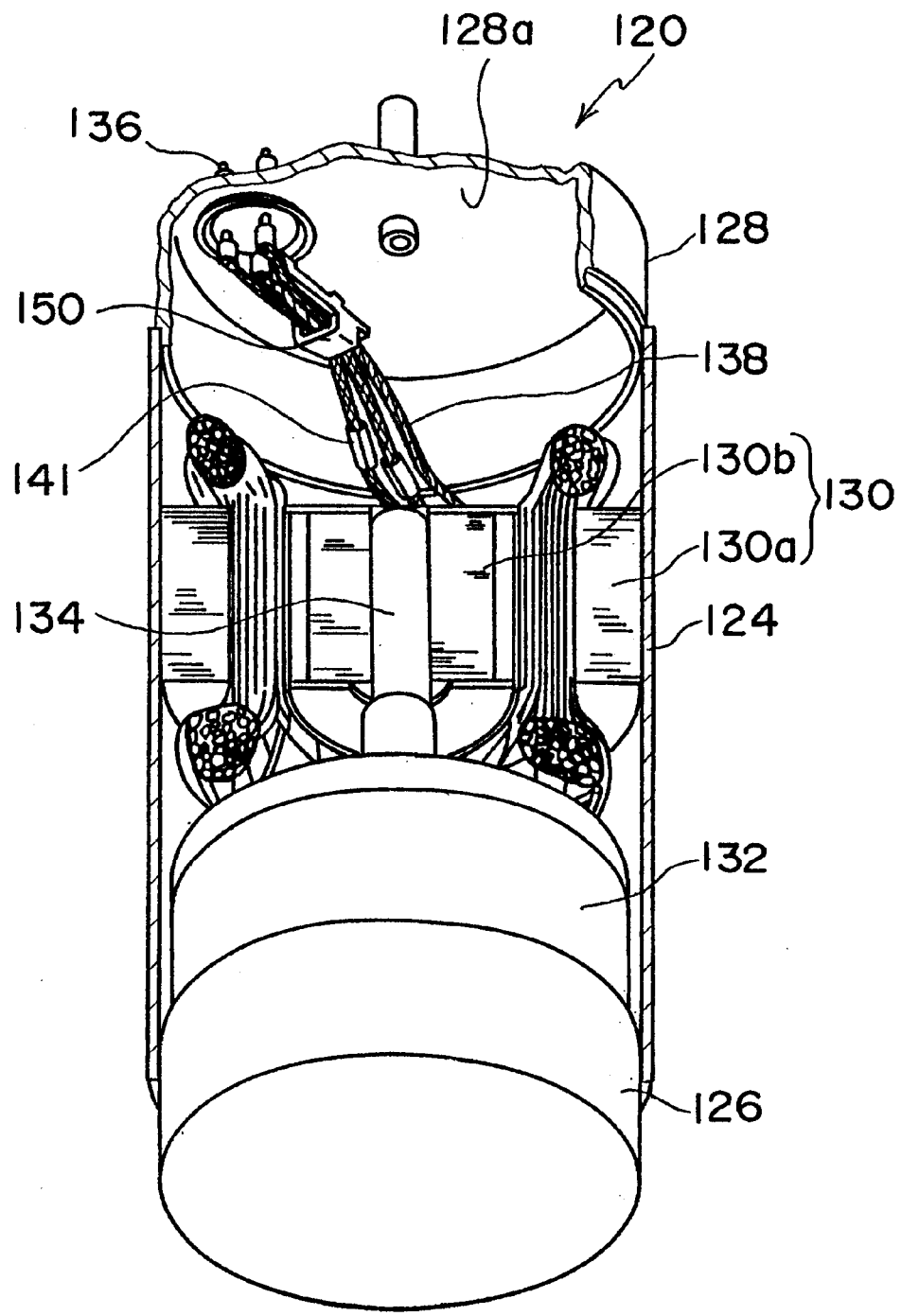
FIG. 7 is a perspective view, partly in section, of a motor-driven compressor according to a second embodiment of the present invention.

FIG. 7 depicts a motor-driven compressor 120 according to a second embodiment of the present invention, which is suitably employed in an electric car. The compressor 120 has a closed vessel made up of a generally cylindrical shell 124, a lower shell 126 joined to one end of the generally cylindrical shell 124, and an upper shell 128 joined to the other end of the generally cylindrical shell 124. The closed vessel accommodates an electric motor 130 and a compression mechanism 132 driven by the electric motor 130. The electric motor 130 includes a stator 130a secured to the generally cylindrical shell 124 and a rotor 130b secured to a crank shaft 134 constituting the compression mechanism 132.

An electric power from a power source (not shown) is supplied to a terminal 136 secured to the upper shell 128 via a driving source (not shown), a wiring system (not shown), and the like. The electric power is then supplied to stator windings via lead wires connected to the terminal 136.

Figure 8:
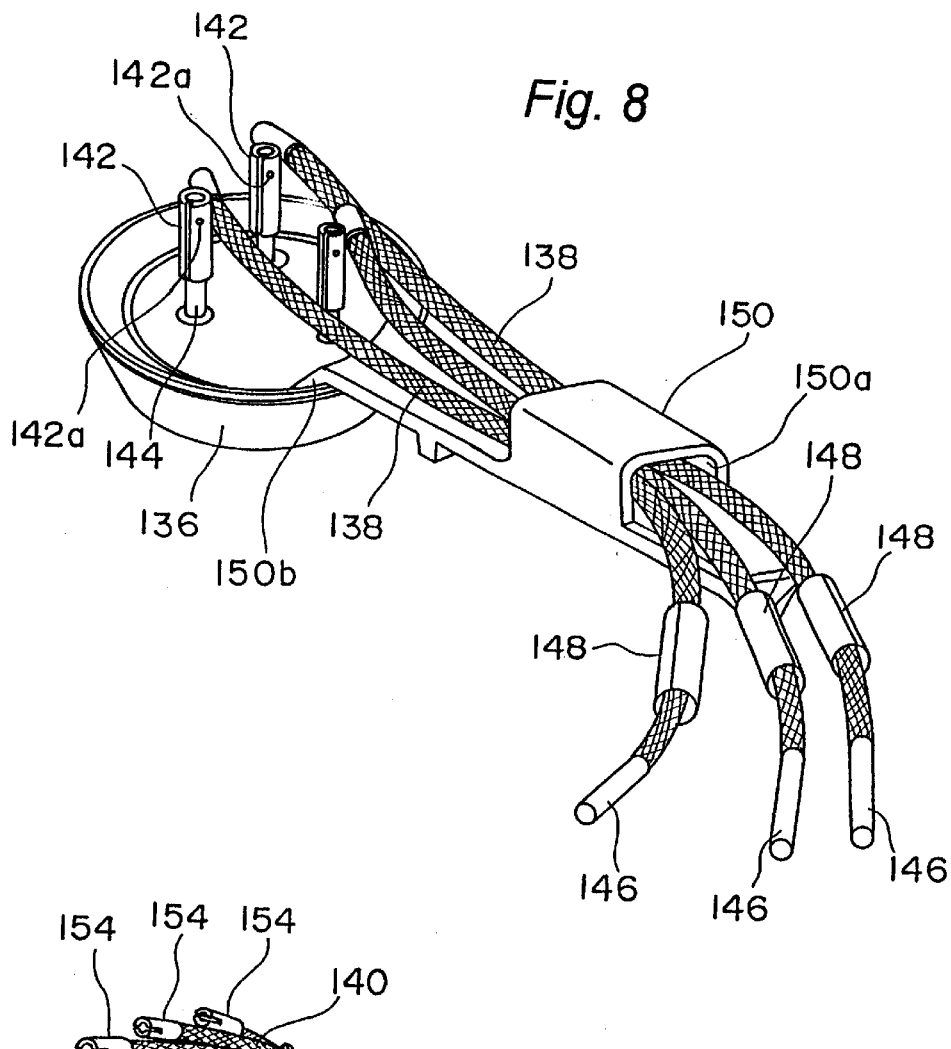
FIG. 8 is a perspective view of a terminal and lead wires connected thereto, which are fitted to the compressor of FIG. 7.
Figure 9:
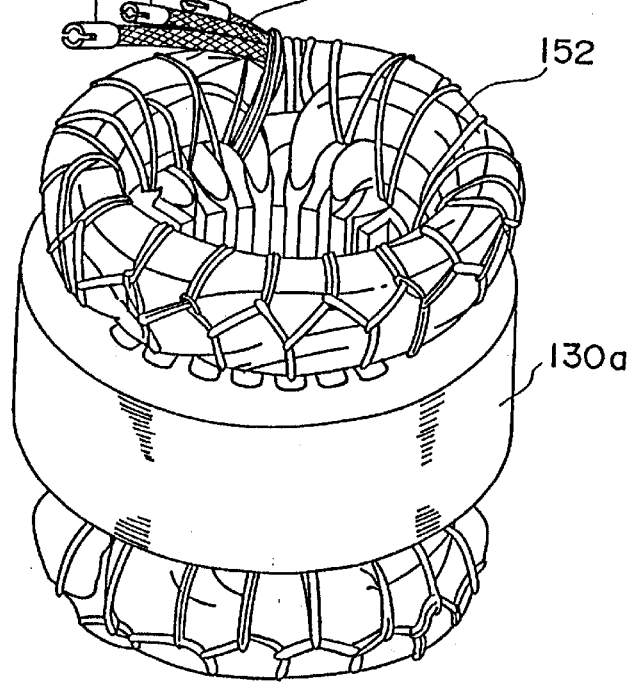
FIG. 9 is a perspective view of a stator mounted in the compressor of FIG. 7.

As shown in FIGS. 8 and 9, each lead wire for connecting one of the stator windings to the terminal 136 is divided into two lead wires 138, 140, one of which is connected to a pin 144 of the terminal 136 and the other of which is connected to one of the stator windings. When the motor-driven compressor 120 is assembled, the two lead wires 138, 140 are connected to each other at an intermediate connecting portion 141.

More specifically, as shown in FIG. 8, each lead wire 138 has a pin receptacle 142 fixedly mounted thereon at a bare end thereof, which is fitted on one of the pins 144 of the terminal 136 and welded thereto via an opening 142a defined in the pin receptacle 142. Each lead wire 138 also has a plug or collet type male terminal 146 fixedly mounted thereon at the other end thereof. An insulation cover 148 is slidably mounted on the lead wire 138 in the vicinity of the collet type male terminal 146.

All the lead wires 138 are loosely inserted into and held by a generally rectangular opening 150a formed at an intermediate portion of a thermosetting wire holder 150, a bent end 150b of which is held in engagement with the terminal 136.

On the other hand, as shown in FIG. 9, the lead wire 140 of each stator winding 152 has a plug receptacle or collet type female terminal 154 fixedly mounted thereon at a bare end thereof.

In assembling the motor-driven compressor 120, the generally cylindrical shell 124 is shrink-fitted to the stator 130a of the electric motor 130 so that the stator 130a may be held in abutment with the inner surface of the generally cylindrical shell 124 at a predetermined position thereof, while the rotor 130b is shrink-fitted to the crank shaft 134 of the compression mechanism 132. Thereafter, the compression mechanism 132 is welded to the generally cylindrical shell 124 accommodating the stator 130a, and the lower shell 126 is then welded to the generally cylindrical shell 124.

Figure 10A:
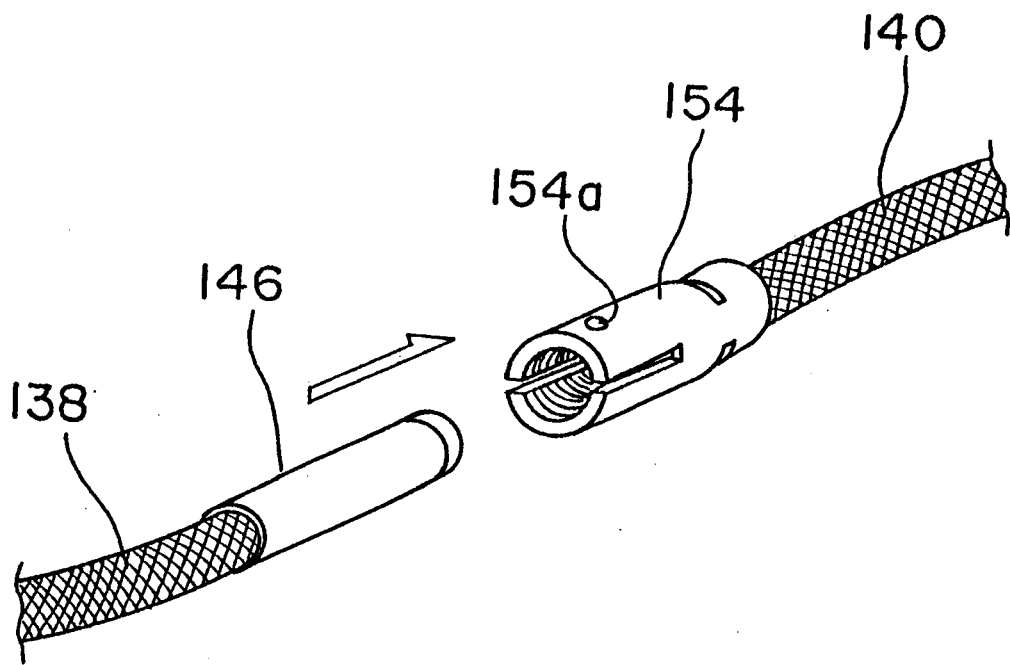
FIG. 10A is a perspective view of an intermediate connecting portion between the two lead wires shown in FIGS. 8 and 9 before the two lead wires are connected to each other.
Figure 10B:
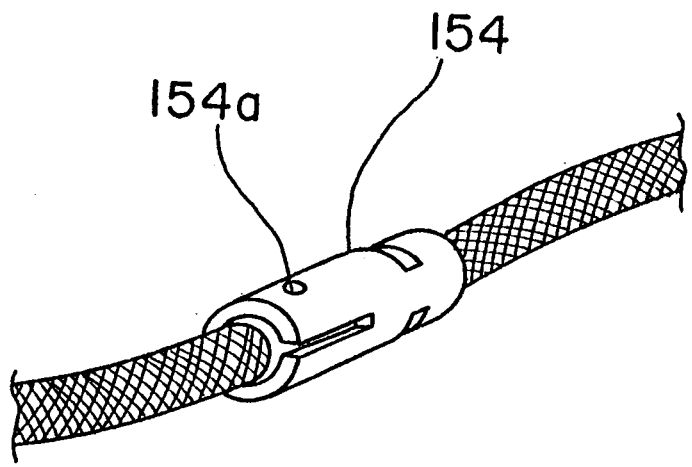
FIG. 10B is a perspective view of the intermediate connecting portion of FIG. 10A after the two lead wires have been connected to each other.

Furthermore, as shown in FIG. 10A, the male terminal 146 of each lead wire 138 connected to the terminal 136 on the upper shell 128 is aligned with and opposed to associated one of the female terminals 154 of the lead wires 140. The male terminal 146 is then forcibly inserted into the female terminal 154 by moving the lead wire 138 in the direction of an arrow. Thereafter, as shown in FIG. 10B, the male and female terminals 146, 154 are joined together by spot-welding via an opening 154a defined in the female terminal 154.

Figure 11A:
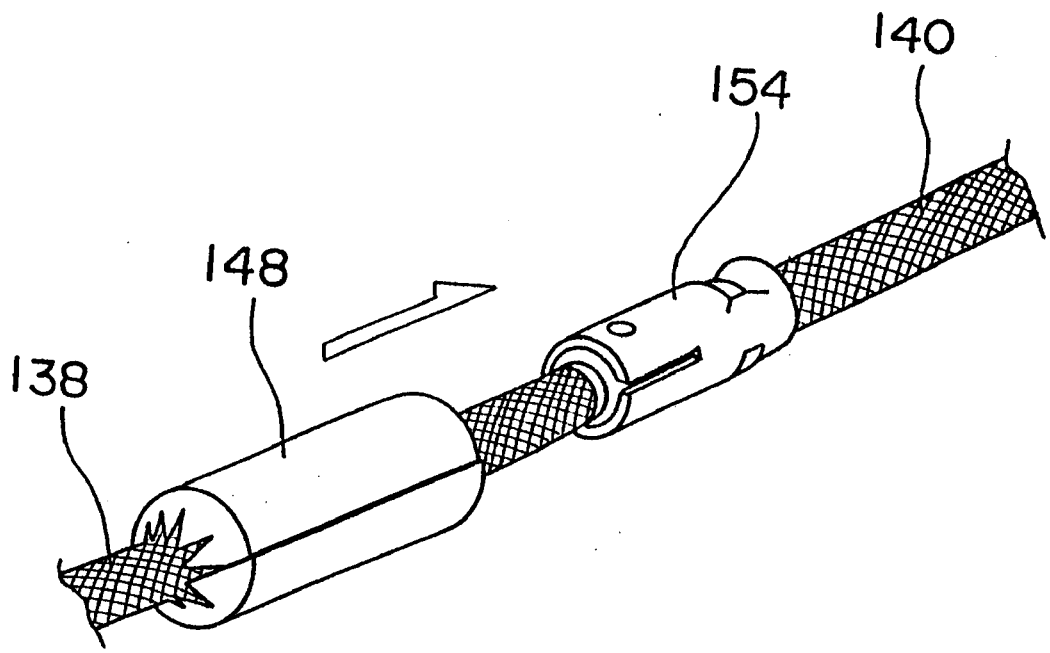
FIG. 11A is a perspective view of the intermediate connecting portion of FIG. 10A before it is covered with an insulation cover.
Figure 11B:
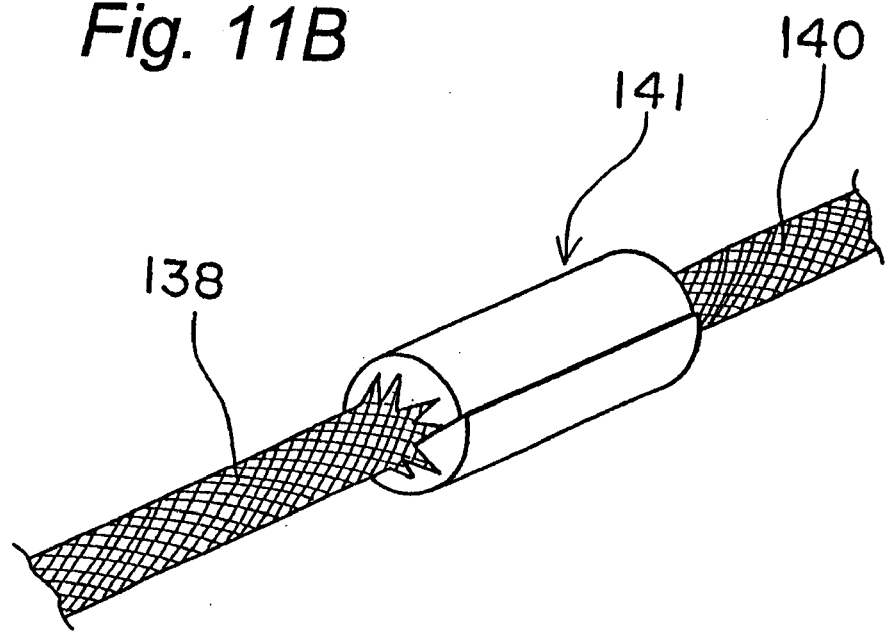
FIG. 11B is a perspective view of the intermediate connecting portion of FIG. 10A after it has been covered with the insulation cover.

Finally, the insulation cover 148 is moved along the lead wire 138 in the direction of an arrow in FIG. 11A so that both the male and female terminals 146, 154 may be completely covered with the insulation cover 148, as shown in FIG. 11B. In this way, the connecting work at the intermediate connecting portion 141 is completed.

Figure 12A:
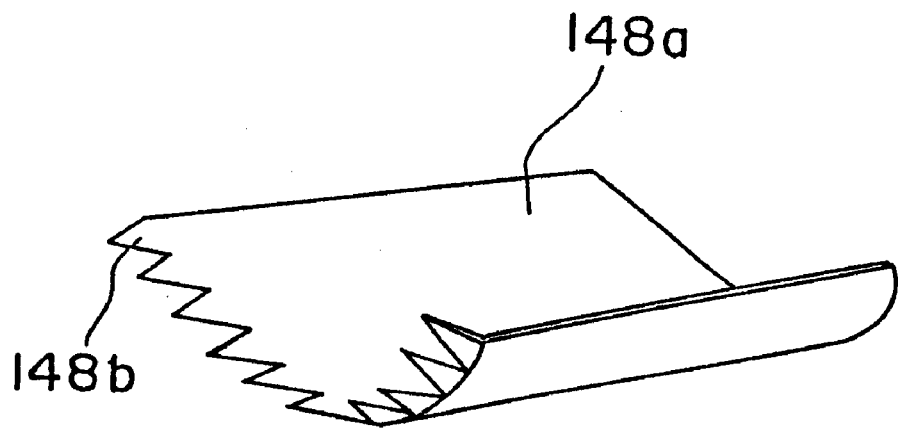
FIG. 12A is a perspective view of the insulation cover before it is rolled up.
Figure 12B:
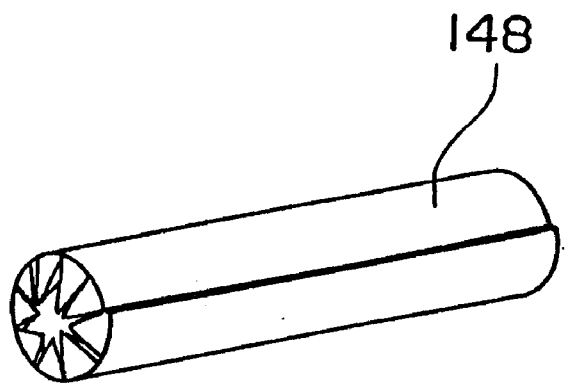
FIG. 12B is a perspective view of the insulation cover after it has been rolled up.

FIGS. 12A and 12B depict the insulation cover 148. As shown in FIG. 12A, a serrated or saw teeth-shaped stopper 148b is first formed with a generally rectangular insulation film 148a on one side thereof and is then folded slightly inwardly. When this insulation film 148a is attached to the lead wire 138, the former is rolled up into a cylindrical shape around the latter, as shown in FIG. 12B. Accordingly, although the insulation cover 148 is allowed to move along the lead wire 138 in the direction of the arrow in FIG. 11A, the saw teeth-shaped stopper 148b prevents the insulation cover 148 from moving in the direction opposite to the arrow. Accordingly, once the connecting work at the intermediate connecting portion 141 has been completed, as shown in FIG. 11B, even if the insulation cover 148 receives a force acting in the direction opposite to the arrow, distal ends of the saw teeth-shaped stopper 148b bite into the lead wire 138 to prevent the movement of the insulation cover 148.

After the connecting work at the intermediate connecting portion 141 has been completed, the upper shell 128 is welded to the generally cylindrical shell 124. Under such condition, all the lead wires 138 are held by the wire holder 150 in engagement with the terminal 136. Because the wire holder 150 prevents the lead wires 138 from being brought into contact with a generally flat end wall 128a of the upper shell 128, thus preventing a leakage of electricity.

Figure 13A:
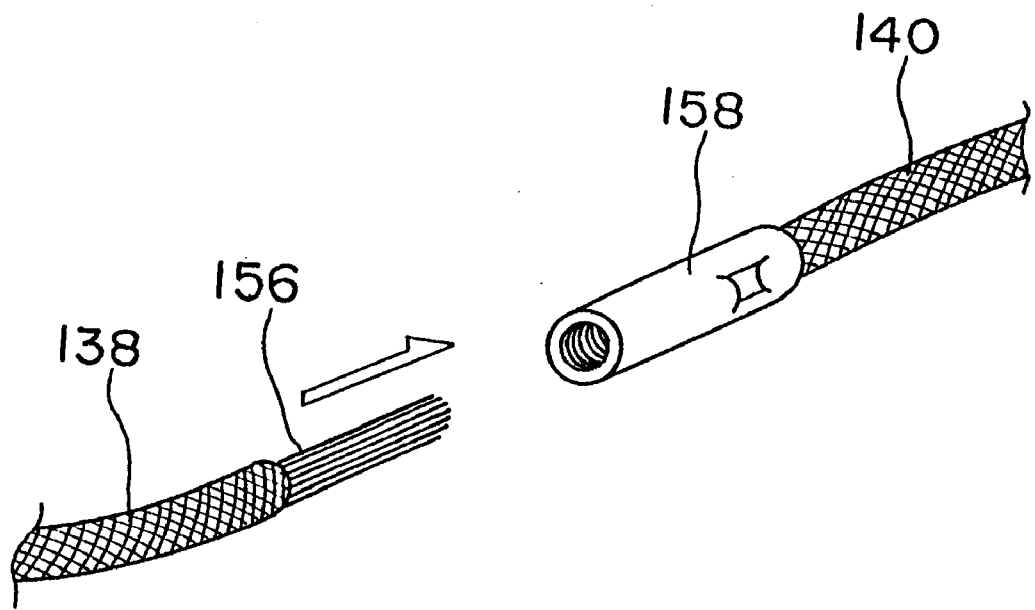
FIG. 13A is a view similar to FIG. 10A, but depicting a modification thereof.
Figure 13B:
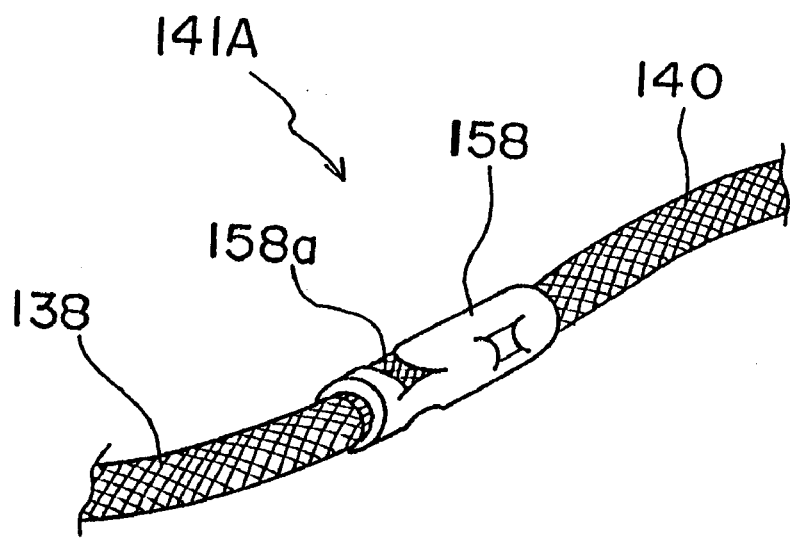
FIG. 13B is a view similar to FIG. 10B, but depicting a modification thereof.

FIGS. 13A and 13B depict a modified form 141A of the intermediate connecting portion 141. As shown therein, a core wire 156 is bared by removing an external insulation from the end of the lead wire 138, while a butt terminal or cylindrical receptacle 158 is fixedly mounted on a bare end of the lead wire 140, for example, by caulking.

When the lead wires 138, 140 are connected to each other, the core wire 156 of the lead wire 138 is inserted into the cylindrical receptacle 158 mounted on the lead wire 140 by moving the lead wire 138 in the direction of an arrow in FIG. 13A. A portion of the cylindrical receptacle 158 is then welded to the core wire 156. In FIG. 13B, reference numeral 158a denotes the welded portion.

After the welding, the cylindrical receptacle 158 is covered with an insulation cover 148 shown in FIGS. 11A and 11B.

Figure 14:
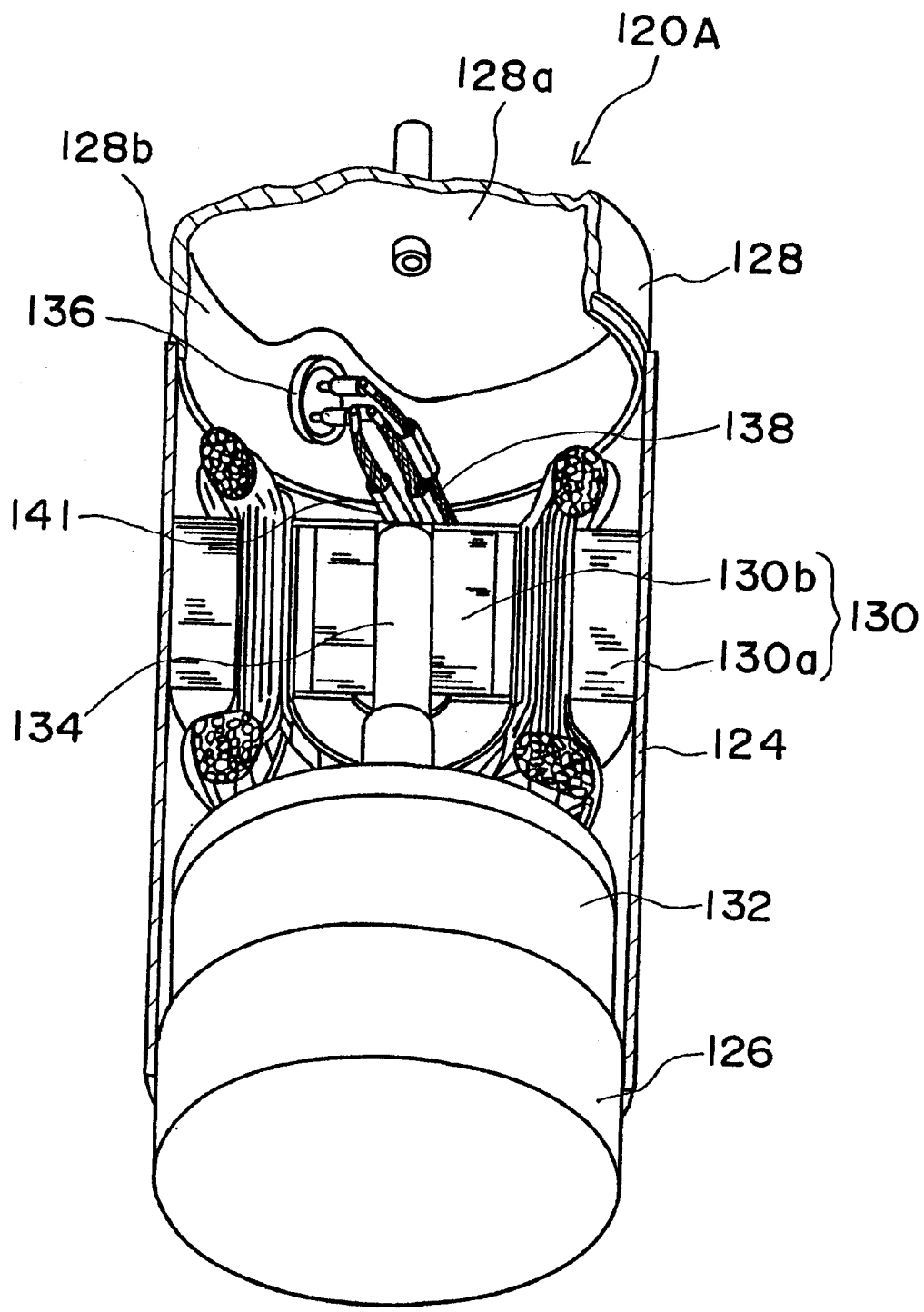
FIG. 14 is a view similar to FIG. 7, but depicting a modification thereof.

FIG. 14 depicts a modification 120A of the motor-driven compressor 120. This compressor 120A differs from the compressor 120 shown in FIG. 7 in that the terminal 136 is secured to a generally cylindrical side wall 128b of the upper shell 128.

The arrangement in which the terminal 136 is located on the generally cylindrical side wall 128b of the upper shell 128 reduces the distance between the terminal 136 and the lead wires 140 of the stator windings 152, making it possible to shorten the lead wires 138. As a result, the workability is enhanced, and without any wire holder, the lead wires 138 are no longer brought into contact with the generally flat end wall 128a of the upper shell 128.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A motor-driven compressor driven by a driving device via a single-circuit external wiring system, said motor-driven compressor comprising:
   a closed vessel;
   a compression mechanism accommodated in the closed vessel; and
   an electric motor accommodated in the closed vessel for driving the compression mechanism, said electric motor comprising three-phase stator windings each having two parallel circuits.

2. The motor-driven compressor according to claim 1, further comprising a terminal secured to the closed vessel and having a plurality of pins, each of the plurality of pins having two tabs secured thereto for connection with the two parallel circuits of the stator winding of each phase.

3. The motor-driven compressor according to claim 2, wherein all the tabs extend radially.

4. The motor-driven compressor according to claim 2, wherein all the tabs extend parallel to one another.

5. The motor-driven compressor according to claim 2, further comprising plural pairs of tab receptacles, each pair of which is connected to the two tabs of each of the plurality of pins, wherein each pair is constituted by two tab receptacles from which respective lead wires extend in opposite directions and which are paired such that the lead wires extend in the same direction.

6. The motor-driven compressor according to claim 1, further comprising a terminal secured to the closed vessel and having a plurality of pins, each of the plurality of pins having an externally threaded portion, to which a nut is tightened for connection with the external wiring system.

7. A motor-driven compressor connected to an external power source via an external wiring system, said motor-driven compressor comprising:
   a closed vessel having a terminal secured thereto for connection with the external wiring system;
   a compression mechanism accommodated in the closed vessel;
   an electric motor accommodated in the closed vessel for driving the compression mechanism, said electric motor comprising a plurality of stator windings;
   a plurality of lead wires for connecting the terminal and the plurality of stator windings to each other, each of the plurality of lead wires being divided into two lead wires; and
   a plurality of intermediate connecting portions each for connecting the two lead wires.

8. The motor-driven compressor according to claim 7, wherein each of the plurality of intermediate connecting portions comprises an insulation cover slidably mounted on one of the two lead wires and wherein after the two lead wires have been connected to each other, a connecting portion therebetween is covered with the insulation cover by sliding the insulation cover along the one of the two lead wires.

9. The motor-driven compressor according to claim 8, wherein the insulation cover has a saw teeth-shaped stopper formed therewith on one side thereof.

10. The motor-driven compressor according to claim 7, wherein the two lead wires are welded together.

11. The motor-driven compressor according to claim 7, further comprising a wire holder held in engagement with the terminal for holding the plurality of lead wires.

12. The motor-driven compressor according to claim 7, wherein the closed vessel has a generally cylindrical side wall, to which the terminal is secured.

13. The motor-driven compressor according to claim 7, wherein the plurality of lead wires are welded to the terminal.

* * * * *